May 26, 1964 J. W. SIMMONS 3,134,421
METHOD OF AND MACHINE FOR CUTTING AND FORMING ARTICLES
Filed Aug. 2, 1960 5 Sheets-Sheet 1

INVENTOR.
JOHN W. SIMMONS
BY Isler & Ornstein
ATTORNEYS

May 26, 1964 J. W. SIMMONS 3,134,421
METHOD OF AND MACHINE FOR CUTTING AND FORMING ARTICLES
Filed Aug. 2, 1960 5 Sheets-Sheet 2

INVENTOR.
JOHN W. SIMMONS
BY
Isler & Ornstein
ATTORNEYS

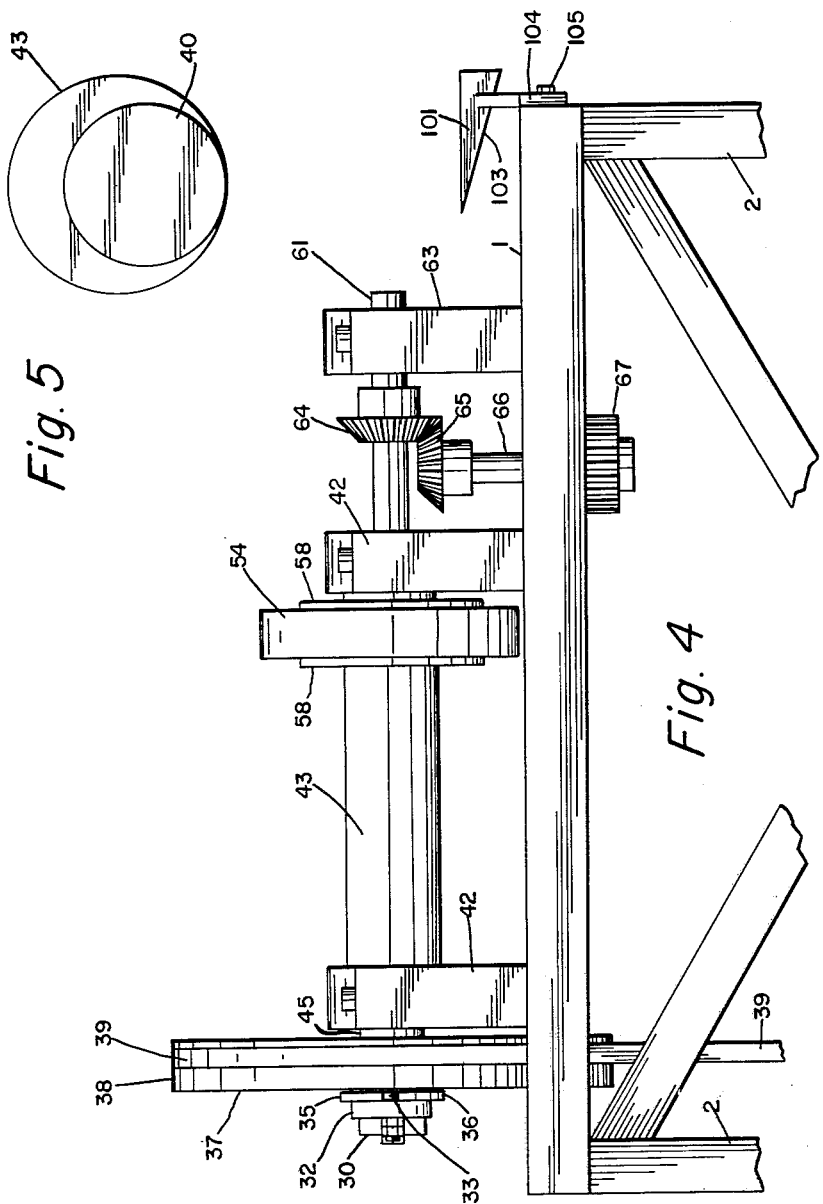

May 26, 1964 J. W. SIMMONS 3,134,421
METHOD OF AND MACHINE FOR CUTTING AND FORMING ARTICLES
Filed Aug. 2, 1960 5 Sheets-Sheet 4

INVENTOR.
JOHN W. SIMMONS
BY Isler & Ornstein
ATTORNEYS

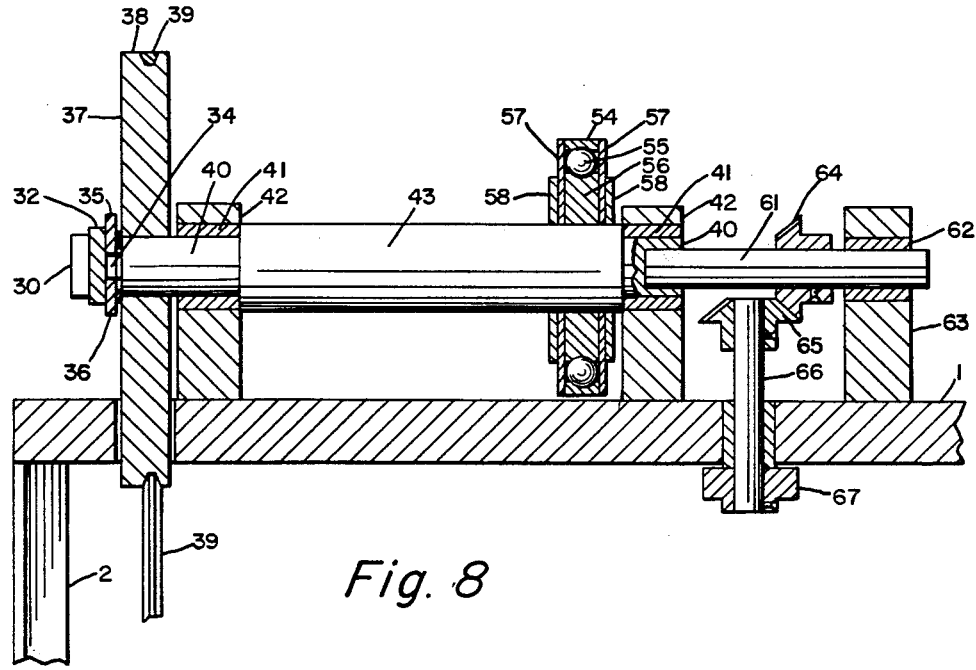
Fig. 8
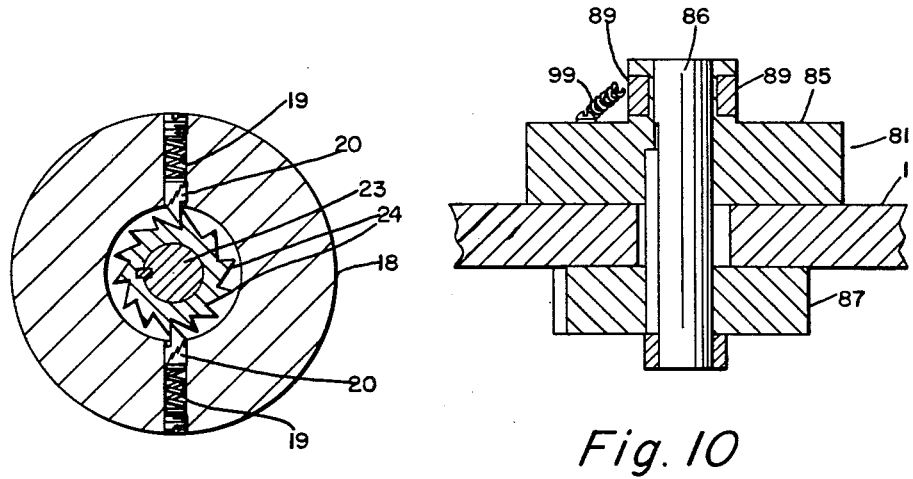
Fig. 9
Fig. 10
INVENTOR.
JOHN W. SIMMONS
BY Isler & Ornstein
ATTORNEYS 3,134,421
METHOD OF AND MACHINE FOR CUTTING AND FORMING ARTICLES
John W. Simmons, Cleveland, Ohio, assignor to The Lamson & Sessions Company, Cleveland, Ohio, a corporation of Ohio
Filed Aug. 2, 1960, Ser. No. 46,958
25 Claims. (Cl. 153—2)

This invention relates generally to methods of and machines for cutting and forming articles, but has reference more particularly to methods and machines for forming articles such as cotter pins, bobby pins, etc., from metallic wire or strip stock, or from fibres.

Machines which have heretofore been used for manufacturing articles of this nature are usually incapable of fabricating more than a single article at a time, and usually embody an excessive number of internal and external cams, which have a tendency to hunt or skip, when operated at high speeds. In fabricating long lengths of material, it becomes necessary to substantially reduce the output of such machines, in order to maintain proper functioning of the parts. In such machines, moreover, the stock or material is fed to the forming tools which are actuated by a series of internal and external cams, so that the movement of the material must be stopped until each cam operates through its forming cycle.

As a result of these drawbacks or disadvantages, the overall output of such machines is materially limited, and frequent breakdowns occur, which further retard production.

The present invention has as its primary object the provision of a method and machine for manufacturing or fabricating articles of the character described, in which virtually all of these disadvantages have been eliminated, and by virtue of which the production of such articles is substantially increased.

Another object of the invention is to provide a method of and machine for manufacturing such articles, in which a plurality of articles can be fabricated simultaneously by a single set of cutting and forming tools.

A further object of the invention is to provide a method of and machine of the character described, in which the number of cams employed is reduced to a minimum, and the tendency to hunt or skip is virtually eliminated.

A still further object of the invention is to provide a method of and machine of the character described, in which a single crankshaft is employed to perform all of the cutting and forming operations, and in which the forming operations are performed at a speed which is a small fraction of the crankshaft speed.

Other objects and advantages of my invention will be apparent during the course of the following description.

In the accompanying drawings forming a part of this specification, and in which like numerals are employed to designate like parts throughout the same, FIG. 1 is a top plan view of a machine embodying the invention;

FIG. 4 is a fragmentary rear elevational view of the machine;

FIG. 5 is an end elevational view of the crankshaft;

FIG. 8 is a fragmentary cross-sectional view, taken on the line 8—8 of FIG. 6;

FIG. 9 is a fragmentary cross-sectional view, taken on the line 9—9 of FIG. 2, and FIG. 10 is a fragmentary cross-sectional view, taken on the line 10—10 of FIG. 1.

Figure 1:
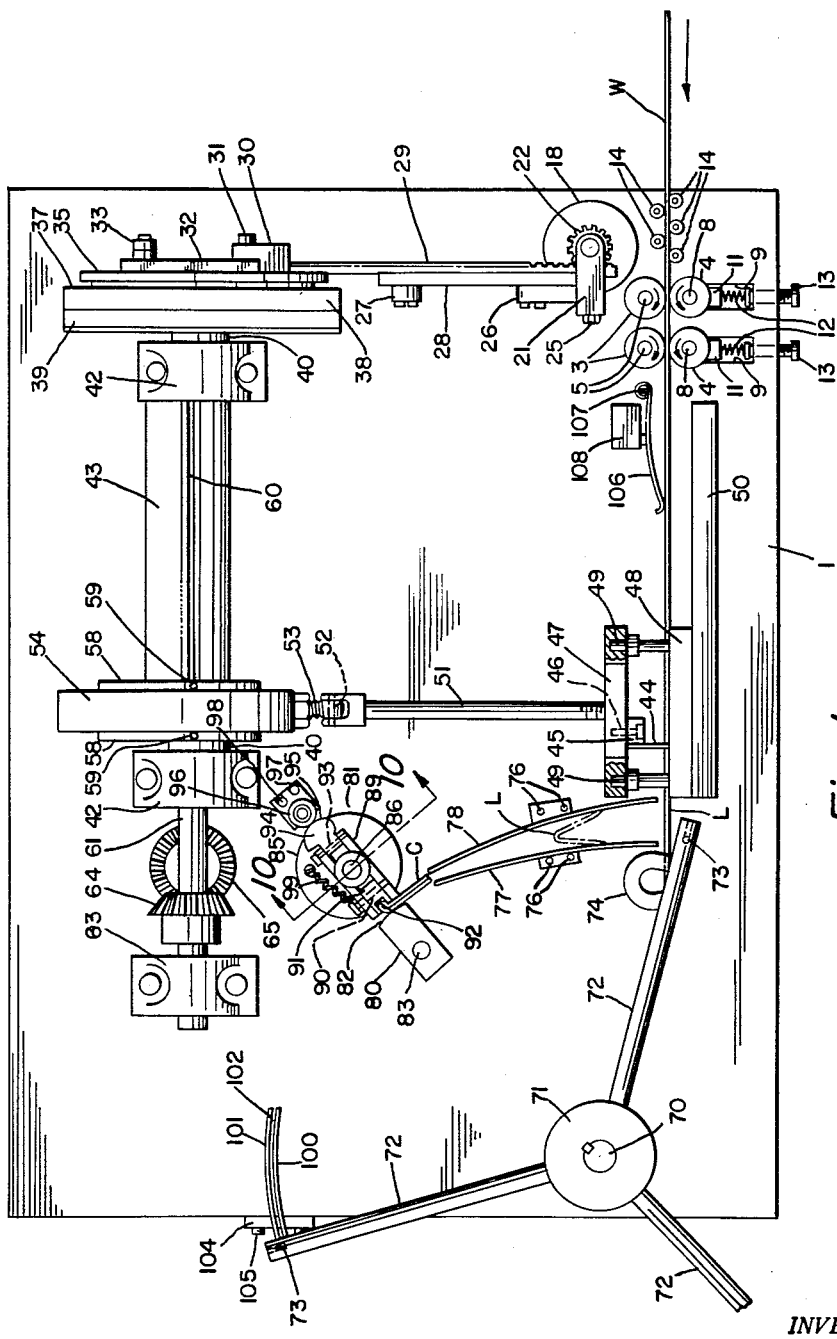

Referring more particularly to the drawings, reference numeral 1 designates a table or platform supported by legs 2, which, in turn, supports a framework or bracket (not shown), upon which a drive motor (not shown) is supported.

The table 1 has mounted thereon, adjacent one corner thereof, two sets of feed rollers, each set comprising a fixed roller 3 and a movable roller 4. The rollers 3 are mounted on shafts 5 which extend through the table 1 and have affixed to their lower ends gears 6, between which a pinion 7 is interposed. The rollers 4 are mounted on shafts 8, which extend through openings 9 in the table and have affixed to their lower ends gears 10, which are in mesh with the gears 6. The rollers 4 are urged against the rollers 3 by means of elements 11 which bear against the shafts 8 and are urged against these shafts by compression coil springs 12, disposed in the openings 9. The compressive force of these springs may be adjusted by means of adjusting screws 13, which are threadedly secured in the table 1.

Behind the rollers 3 and 4, a set of rolls 14 is provided, these rolls being in staggered arrangement and each provided with vertically-spaced annular grooves 15 (FIG. 2) through which the wires W pass. The rolls 14 thus function not only to straighten the wires W, as they enter the machine, but also to guide the wires in proper vertically-spaced arrangement to the rollers 3 and 4.

The rollers 3 and 4 are driven by the gears 6, 7 and 10, and these gears, in turn, are driven by a pinion 16 (FIG. 3) disposed below the table 1 and mounted on a shaft 17 which extends through the table. The shaft 17 is connected to a cylindrical block 18, which has mounted in diametrically-opposed openings 19 therein, spring-pressed pawls 20 (FIG. 9). Above the block 18 is a bracket 21 upon which is mounted for rotation a pinion 22 having an extension 23 of reduced diameter extending axially into the block 18 and provided with ratchet teeth 24, which are adapted to be engaged by the pawls 20.

The bracket 21 is secured, as by a screw 25, to a post 26, which together with another post 27, supports a channel member 28 in which a rack 29 is guided for reciprocal movement, this rack being in mesh with the pinion 22.

As the rack 29 moves forwardly, as viewed in FIG. 1, it drives the pinion 22 in a counterclockwise direction, the ratchet teeth 24 engage the pawls 20, and the block 18 is rotated, causing the rollers 3 and 4 to feed the wires W to the left.

As the rack 29 moves rearwardly, it drives the pinion 22 in a clockwise direction, as viewed in FIG. 1, and the ratchet teeth 24 slide over the pawls 20, so that the block 18 remains stationary, and no movement is imparted to the rollers 3 and 4.

The rack 29 has an enlarged rear end 30 which is pivotally connected, as by a pin 31, to a connecting rod 32, which, in turn, is provided with a roller 33, which is movable in a slot 34 formed between plates 35 and 36 which are secured to the outer face 37 of a flywheel 38, the slot 34 extending diametrically across this face of the flywheel. The flywheel 38 is driven by the electric motor, to which reference has been made, through the intermediary of an endless V-belt 39, and it will be apparent that as the flywheel is rotated, the rack 29 will be reciprocated through the intermediary of the elements 35, 36, 33, 32, and 31.

The flywheel 38 is mounted on one end of a heavy crankshaft 40, which shaft is mounted for rotation in bearings 41, which, in turn, are supported by pillow blocks 42, mounted on the table 1. The crank portion 43 of the shaft, which extends between the bearings 41, serves a purpose to be presently described.

For the purpose of cutting the wires W into desired or required lengths, I have provided mechanism which comprises a cut-off die 44 which extends from a support 45 which is secured, as by screws 46 to a bar 47. The bar 47 is supported for movement towards and away from a coacting cut-off anvil block 48, on pins 49 which extend from the anvil block and the anvil block 48 is attached to a back plate 50, which is secured to the table 1. The bar 47 is moved towards and away from the anvil 48 by means of a connecting rod 51 which is secured to the bar 47, and is pivotally connected, as by a pin 52, to a stud 53, which extends from an annular member 54. The member 54 forms the outer race of a ball bearing 55 (FIG. 8), the inner race 56 of which is slidably secured to the crank portion 43 of the shaft 40. The bearing further includes retainer or end plates 57, and the bearing is retained against displacement axially of the shaft 40 by means of plates 58, which are retained in position by means of set screw 59 (FIG. 1) extending through the plates and into a slot 60 in the surface of the crank portion 43, this manner of locking the plates 58 to the shaft 40 avoiding mutilation of the shaft.

It will be apparent from the foregoing description that as the shaft 40 rotates, the throw of the crank portion 43 of the shaft will be effective to reciprocate the connecting rod 51 to effect the cutting of the wires to the desired length.

The shaft 40 is provided with an extension 61, the outer end of which is journalled for rotation in a bearing 62 which is supported in a pillow block 63 mounted on the table 1. The extension 61 has affixed thereto a bevel gear 64 which drives a bevel gear 65 mounted on a shaft 66 which extends vertically through the table. The shaft 66 is provided at its lower end, beneath the table 1, with a pinion 67. The pinion 67 drives a bull gear 68, which, in turn, drives a bull gear 69.

Figure 2:
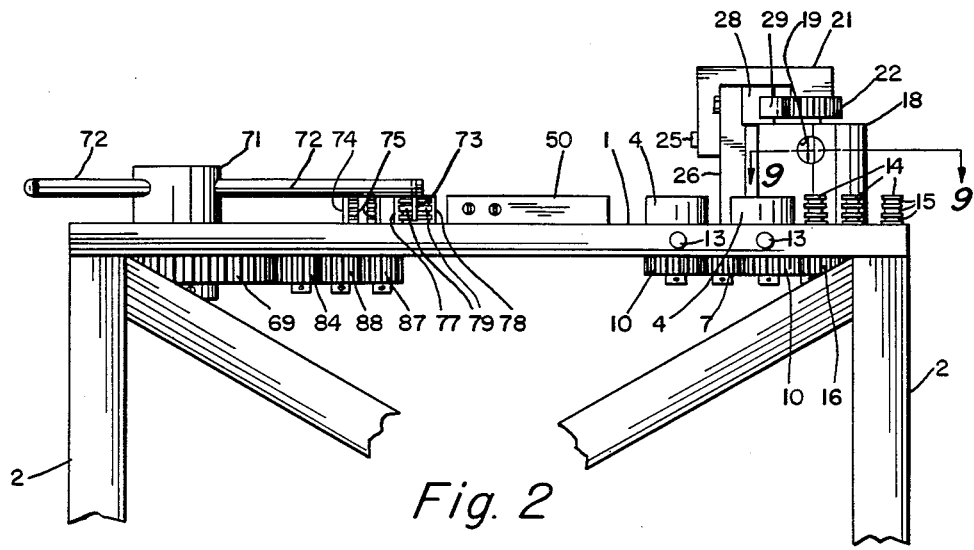
FIG. 2 is a fragmentary front elevational view of the machine.
Figure 3:
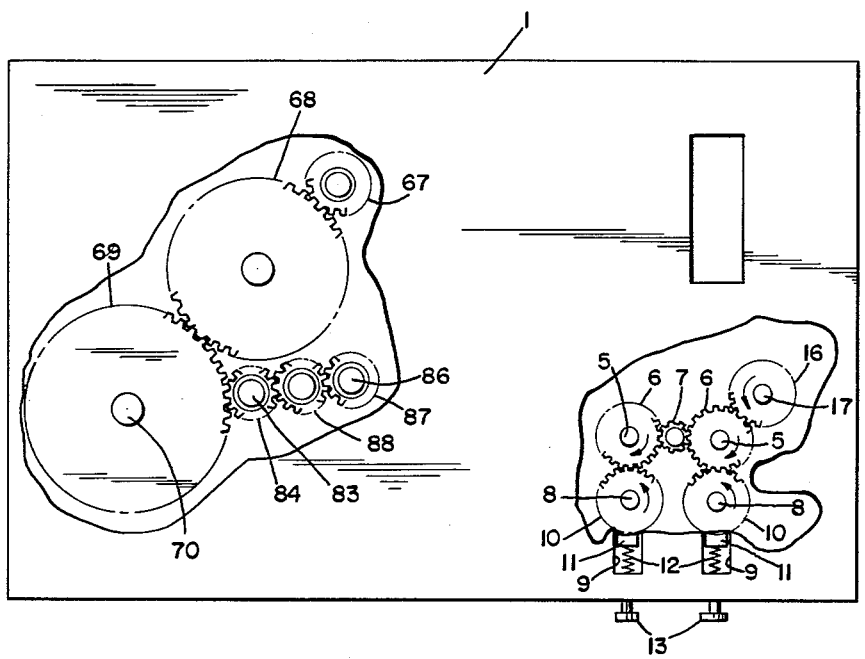
FIG. 3 is a fragmentary plan view of the machine, with all of the working parts removed, and with portions of the table broken away to illustrate the various driving gears.
Figure 6:
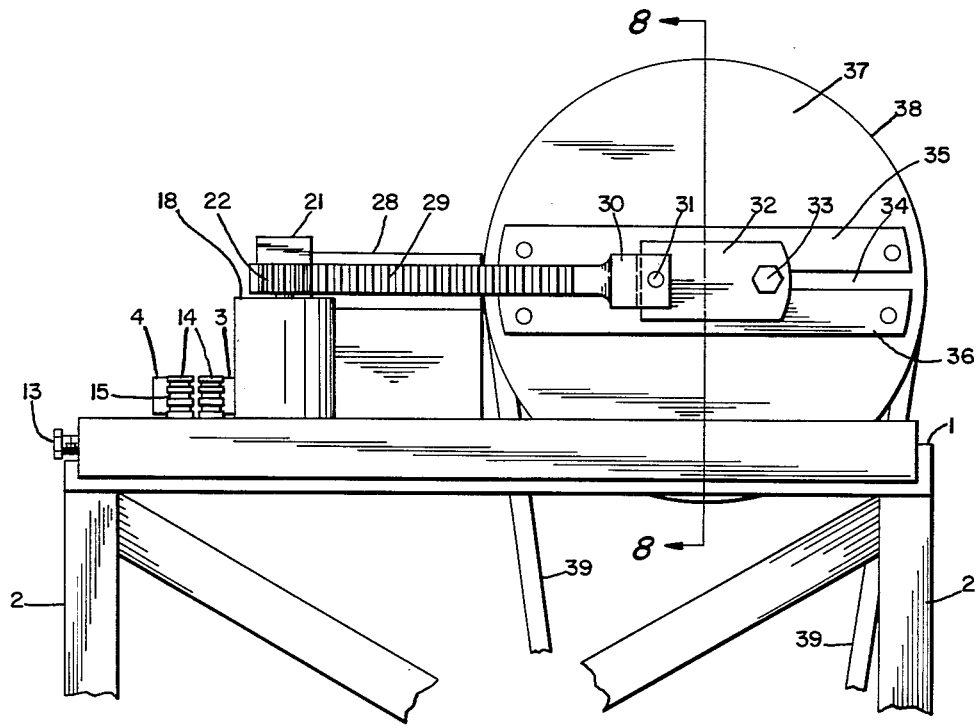
FIG. 6 is a fragmentary end elevational view of the machine, as viewed from the right end of FIG. 2.
Figure 7:
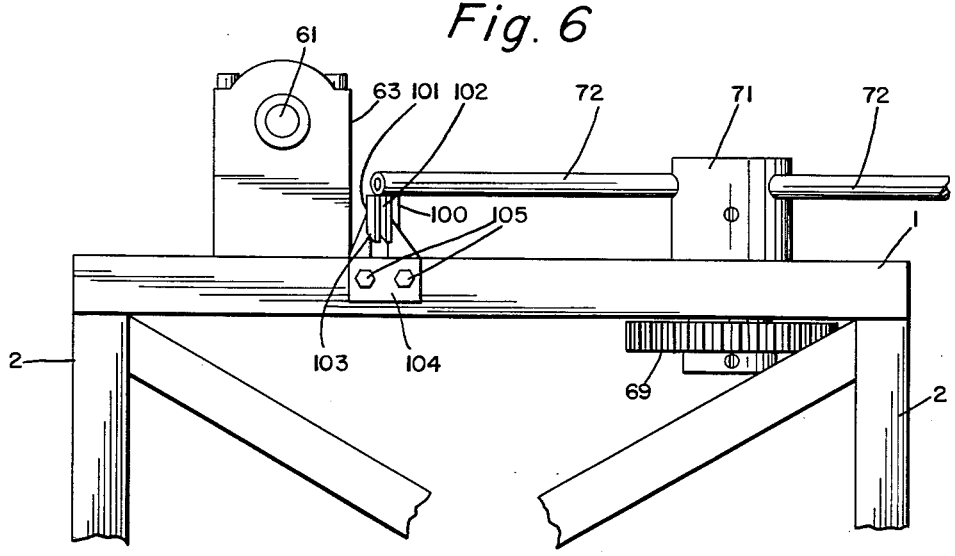
FIG. 7 is a fragmentary end elevational view of the machine, as viewed from the left end of FIG. 2.

The bull gear 69, as shown in FIGS. 2 and 3, is secured to a shaft 70, which extends vertically through the table 1 and is keyed to a hub member 71, from which a series of circumferentially-spaced arms 72 extend radially. In this instance, three such arms are illustrated, spaced 120 degrees cricumferentially from each other. The function of these arms will be explained in connection with the operation of the machine. Each of the arms 72 is provided with a downwardly extending forming tool 73, which, in this instance, comprises a round pin.

Secured to the table 1 is a magnet 74, the pole faces of which are provided with grooves 75, which are spaced vertically to correspond with the grooves 15 in the rolls 14, the grooves 75 being aligned with the wires W, so as to receive these wires in the course of operation of the machine, as will be presently explained.

Secured to the table 1, as by means of screws 76, is a pair of guides 77 and 78, which art arranged in the arcuate path of movement of the pins 73 and are provided on their inner faces with longitudinally extending grooves 79 which are coplanar with the grooves 15 and 75. These guides, as best shown in FIG. 1, converge.

For the purpose of forming the heads of the articles, in this case, cotter pins, mechanism is provided comprising an anvil 80 and a forming tool, generally designated by reference character 81.

The anvil 80 is provided with an arcuate grooved anvil surface 82 at one end, and is secured to a shaft 83 which extends through the table 1 and is driven by a gear 88, which is driven by the bull gear 69 through an idler gear 84.

The forming tool 81 comprises a circular plate 85 which is secured to a shaft 86 which extends through the table 1 and is driven by a gear 87 disposed below the table. The gear 87 is driven by the gear 88. Mounted on the plate 85 for reciprocal movement diametrically of this plate, is a grooved shuttle 89, to one end of which is secured, as by a bolt 90, a grooved forming head 91 having a recess 92 therein. To the other end of the shuttle 89, there is secured, as by a bolt 93, a cam 94 having a cam surface 95 at its outer end. Beyond this cam surface 95, the table has mounted thereon, a ball-bearing 96 which is adapted to coact with the cam 94 in the course of operation of the machine. The bearing 96 is revolubly supported on a plate 97 which is secured to the table by bolts 98. The shuttle 89 is normally pulled in a direction toward the bearing 96 by means of an extension coil spring 99 which interconnects the bolt 90 with the plate 85.

The machine is also provided with a pair of spaced arcuate stripping plates 100 and 101, the space 102 between which is sufficient to receive the pins 73, but insufficient to permit passage therethrough of the articles which are being formed, these articles being stripped from the pins 73 by the lower inclined edges 103 of the stripping plates (FIG. 4). The plates 100 and 101 are supported by a bracket 104 which is secured to one end of the table 1 by means of screws 105.

Having thus described the machine in its mechanical aspects, the operation of the machine will now be described, as applied, for example, to the manufacture of cotter pins.

The wires W, from which the cotter pins are to be made, are drawn from reels of such wires by the rollers 3 and 4, through the grooves 15 of the rolls 14, thereby straightening the wires. To insure proper pulling of the wires by the rollers 3 and 4, the pressure of these rolls on the wires may be adjusted by adjustment of the screws 13 to increase or decrease the compressive force of the springs 12.

The wires W are fed in the direction of the arrow in FIG. 1, such movement of the wires continuing as long as the rack 29 moves in a downward direction, as viewed in FIG. 1.

The wires, during this movement, proceed to the magnet 74, entering the grooves 75 in the magnet, the poles of the magnet holding the wires pending the cutting of the portions of the wires to the lengths required for manufacture into cotter pins. At this point, the rack 29 commences to retract, thereby preventing further feeding of the wires. Concurrently with such retraction of the rack, the cut-off die 44 is moved by the rod 51 against the anvil block 48, thereby cutting the wires to the required length.

With the wires thus cut to the required length, these lengths, as indicated by the reference character L in FIG. 1, are engaged at their mid-point by the forming pin 73 on one of the arms 72, and are bent by such pin in the manner indicated by the broken lines in FIG. 1, the ends of such lengths being dragged through the grooves 79 in the guides 77 and 78. As the lengths of wires proceed through these guides, the lengths, due to the convergence of the guides, are formed into the shape of a cotter pin, as indicated at C in FIG. 1. At this point, the pin 73 acts as a die to aid in forming the head of the cotter pins.

When the cotter pins have reached the point, indicated at C in FIG. 1, the anvil 80 and forming tool 81 have been rotated to the position shown in solid lines in FIG. 1, at which position the shuttle 89, due to the pressure of the cam 94 against the ball bearing 96, is moved towards the surface 82 of the anvil 80, causing the head portion of the cotter pin to enter the recess 92 in the forming head 91, thereby completing the formation of the head of the cotter pin about the forming pin 73.

The finished cotter pins which cling to the pin 73 are then carried by the pin 73 away from the anvil 80 and forming tool 81 to the stripping plates 100 and 101, the inclined edges 103 of which strip the cotter pins from the pin 73, the pin 73 then proceeding through the space 102 between these plates.

The gear ratios are so designed, in this instance, that the hub member 73 rotates at one-third the speed of the crankshaft 40, since the lengths of wire to be formed are cut off as each arm 72 comes into position for forming.

If it is desired to vary the lengths of the wire for forming articles of different lengths or dimensions, the initial position of the roller 33 in the slot 34, with reference to the center of the flywheel 38 may be adjusted. For varying the lengths of the cut-off wires, the position of the die 44 and anvil block 48 may be adjusted, the bearing 54—55—56 being adjustable along the crankshaft to any desired position for this purpose. In forming wires of different lengths, the spacing as well as the angle of convergence between the guides 77 and 78 may be adjusted, as required.

In the event that the wires between the feed rollers 3 and 4 and the cut-off dies 44 and 48 should, for any reason, become buckled, the buckled portion of the wires will exert lateral pressure against a spring 106 which is secured to the table 1 by means of a screw 107, thereby opening a normally-closed switch 108 which controls the flow of current to the drive motor, thereby stopping the machine instantly, and preventing injury to the machine as well as loss of wire stock.

Although the machine has been described particularly with reference to the manufacture of cotter pins, it will be readily understood that the principles involved are applicable also to numerous other articles from wire or strip, such, for example, as bobby or hair pins, etc.

It is thus seen that I have provided a method and machine in which all of the drawbacks or disadvantages of prior machines used for this purpose have been eliminated, and by virtue of which the production of articles of the character described is substantially increased.

It is also seen that I have provided a method and machine in which a plurality of such articles can be fabricated simultaneously by means of a single set of cutting and forming tools, in which the number of cams and other working parts is reduced to a minimum, and in which a single crankshaft is employed to perform all of the cutting and forming operations, and in which the forming operation is performed at a speed which is but a small fraction of the crankshaft speed.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. In a machine of the character described, means for successively cutting elongated material adjacent the lead-end thereof into blanks of predetermined length, holding means spaced from said cutting means for temporarily holding each blank cut from said lead-end, means for forming said blanks into articles, and means for continuously feeding said blanks to said forming means, said feeding means including elements movable in a circular path intersecting the path of movement of said elongated material between said cutting means and said holding means.

2. A machine as defined in claim 1 wherein said holding means comprises a magnet.

3. A machine as defined in claim 1 wherein said holding means comprises a magnet having a pair of pole members spaced apart along the path of movement of said elongated material.

4. In a machine of the character described, means for feeding elongated stock in a rectilinear path, means operable in synchronism with said feeding means for cutting said stock into predetermined lengths constituting blanks from which articles are to be formed, means for forming said blanks into articles, and means operable in synchronism with said feeding means for moving said blanks to said forming means, said moving means comprising circumferentially-spaced elements movable in a circular path which intersects said rectilinear path in a crossing relation thereto for displacing said blanks therefrom by movement in a direction transverse to said rectilinear path.

5. The method of forming articles from bendable material, said method comprising the steps of feeding the material in a rectilinear direction, cutting said material into blanks of predetermined length, moving said blanks in a circular path which intersects said first-named direction of movements, and bending and forming said blanks into articles in the course of their circular movement.

6. The method, as defined in claim 5, including the step of magnetically holding said blanks pending movement thereof in said circular path.

7. The method, as defined in claim 5, including the step of stripping the articles from said moving means after they have moved through only an arc of said circular path.

8. The method of forming cotter pins from wire stock, said method comprising the steps of feeding the stock in a rectilinear direction, cutting said stock into blanks of predetermined length, moving said blanks in an arcuate path, bending said blanks and forming heads thereon in the course of said arcuate movement to form finished cotter pins, and removing said cotter pins at the termination of said arcuate movement.

9. In a machine of the character described, means for forming elongated blanks into articles, means for carrying said blanks to said forming means, said last-named means including a revoluble hub member, circumferentially-spaced arms extending radially from said hub member, elements extending from said arms and adapted to engage said blanks, and means for holding the blanks pending movement of the blanks by said elements to said forming means.

10. A machine, as defined in claim 9, in which said holding means comprises a magnet.

11. In a machine of the character described, means for forming elongated blanks of predetermined length into articles, means for continuously feeding said blanks to said forming means, said feeding means including elements movable in a circular path intersecting and crossing the direction of length of said blanks at the inception of said feeding, and means for holding individual blanks in a position for engagement of the mid-portion of said blanks by said elements.

12. In a machine of the character described, means for forming elongated blanks of predetermined length into articles, and means operable in synchronism with said forming means for moving said blanks to said forming means, said moving means comprising circumferentially-spaced elements movable in a circular path which intersects the direction of length of said blanks at the inception of said feeding, said forming means including convergent guides disposed at opposite sides of the path of movement of said spaced elements and effective to partially bend the blanks as they are moved by said elements.

13. A machine, as defined in claim 12, in which said forming means includes rotating coacting dies effective to finish the formation of said articles.

14. A machine, as defined in claim 13, including means for stripping the articles from said elements after the articles have been formed.

15. In a machine of the character described, means for cutting elongated material into blanks of predetermined length, means for forming said blanks into articles, and means for continuously feeding said blanks to said forming means, said feeding means including elements movable in a circular path intersecting the path of movement of said elongated material, said elements being in the form of dies which coact with said forming means to form said articles.

16. In a machine of the character described, means for cutting elongated material into blanks of predetermined length, means for forming said blanks into articles, means for continuously feeding said blanks to said forming means, said feeding means including elements movable in a circular path intersecting the path of movement of said elongated material, and a guide in the path of movement of said elements, said elements coacting with said guide to bend said blanks.

17. In a machine of the character described, means for cutting elongated material into blanks of predetermined length, means for forming said blanks into articles, and means for continuously feeding said blanks to said forming means, said feeding means including elements movable in a circular path intersecting the path of movement of said elongated material, and a guide in the path of movement of said elements, said elements coacting with said guide to bend said blanks, said forming means comprising dies movable in synchronism with said feeding means to form portions of said blanks.

18. In a machine of the character described, means for feeding elongated stock in a rectilinear path, means operable in synchronism with said feeding means for cutting said stock into predetermined lengths constituting blanks from which articles are to be formed, means for forming said blanks into articles, and means operable in synchronism with said feeding means for moving said blanks to said forming means, said moving means comprising circumferentially-spaced elements movable in a circular path which intersects said linear path of movement of said stock, said forming means comprising spaced convergent guides disposed at opposite sides of the path of movement of said spaced elements and effective to partially bend the blanks as they are moved by said elements.

19. In a machine of the character described, means for feeding elongated stock in a rectilinear path, means operable in synchronism with said feeding means for cutting said stock into predetermined lengths constituting blanks from which articles are to be formed, means for forming said blanks into articles, and means operable in synchronism with said feeding means for moving said blanks to said forming means, said moving means comprising circumferentially-spaced elements movable in a circular path which intersects said rectilinear path of movement of said stock, spaced convergent guides disposed at opposite sides of the path of movement of said spaced elements and effective to partially bend the blanks as they are moved by said elements and said forming means comprising coacting dies effective to form said blanks.

20. In a machine of the character described, means for feeding elongated stock in a rectilinear path, means operable in synchronism with said feeding means for cutting said stock into predetermined lengths constituting blanks from which articles are to be formed, means for forming said blanks into articles, means operable in synchronism with said feeding means for moving said blanks to said forming means, said moving means comprising circumferentially-spaced elements movable in a circular path which intersects said rectilinear path of movement of said stock, said forming means comprising spaced convergent guides disposed at opposite sides of the path of movement of said spaced elements and effective to partially bend the blanks as they are moved by said elements and coacting dies effective to form said blanks, and means for stripping the articles from said elements after the articles have been formed.

21. In a machine of the character described, means for feeding elongated stock in a rectilinear path, means operable in synchronism with said feeding means for cutting said stock into predetermined lengths constituting blanks from which articles are to be formed, means for forming said blanks into articles, and means operable in synchronism with said feeding means for moving said blanks to said forming means, said moving means comprising circumferentially-spaced elements movable in a circular path which intersects said rectilinear path of movement of said stock, said feeding means including a crankshaft, said cutting means being actuated by said crankshaft and adjustable longitudinally of said crankshaft to vary the length of the blanks.

22. In a machine of the character described, means for feeding elongated stock in a rectilinear path, means operable in synchronism with said feeding means for cutting said stock into predetermined lengths constituting blanks from which articles are to be formed, means for forming said blanks into articles, means operable in synchronism with said feeding means for moving said blanks to said forming means, said moving means comprising circumferentially-spaced elements movable in a circular path which intersects said rectilinear path of movement of said stock, a rotatable crankshaft, drive means for driving said feed means from said crankshaft, drive means for driving said cutting means from said crankshaft, and means effective on at least one of the two last-mentioned drive means and adjustable to vary the length of the blanks.

23. In a machine of the character described, means for forming elongated blanks of predetermined length into articles, and means for continuously feeding said blanks to said forming means, said feeding means including elements movable in a circular path intersecting the direction of length of said blanks at the inception of said feeding, said elements being in the form of dies which coact with said forming means to form said articles.

24. In a machine of the character described, means for forming elongated blanks of predetermined length into articles, means for continuously feeding said blanks to said forming means, said feeding means including elements movable in a circular path intersecting the direction of length of said blanks at the inception of said feeding, and a guide in the path of movement of said elements, said elements coacting with said guide to bend said blanks.

25. In a machine of the character described, means for forming elongated blanks of predetermined length into articles, and means for continuously feeding said blanks to said forming means, said feeding means including elements movable in a circular path intersecting the direction of length of said blanks at the inception of said feeding, said forming means including dies movable in synchronism with said feeding means to form portions of said blanks.

References Cited in the file of this patent

UNITED STATES PATENTS

| Number | Name | Date |
| --- | --- | --- |
| 277,577 | King | May 15, 1863 |
| 330,661 | Adt | Nov. 17, 1885 |
| 345,717 | Murray et al. | July 20, 1886 |
| 1,106,484 | Young | Aug. 11, 1914 |
| 2,295,078 | Green | Sept. 8, 1942 |
| 2,578,216 | Young | Dec. 11, 1951 |
| 2,722,274 | Turbull | Nov. 1, 1955 |
| 2,766,869 | Bauman | Oct. 16, 1956 |
| 2,933,124 | Benson et al. | Apr. 19, 1960 |